S. EINSTEIN.
QUICK TRAVERSE CONTROL.
APPLICATION FILED MAY 27, 1913.
1,092,097.
Patented Mar. 31, 1914.
4 SHEETS—SHEET 2.
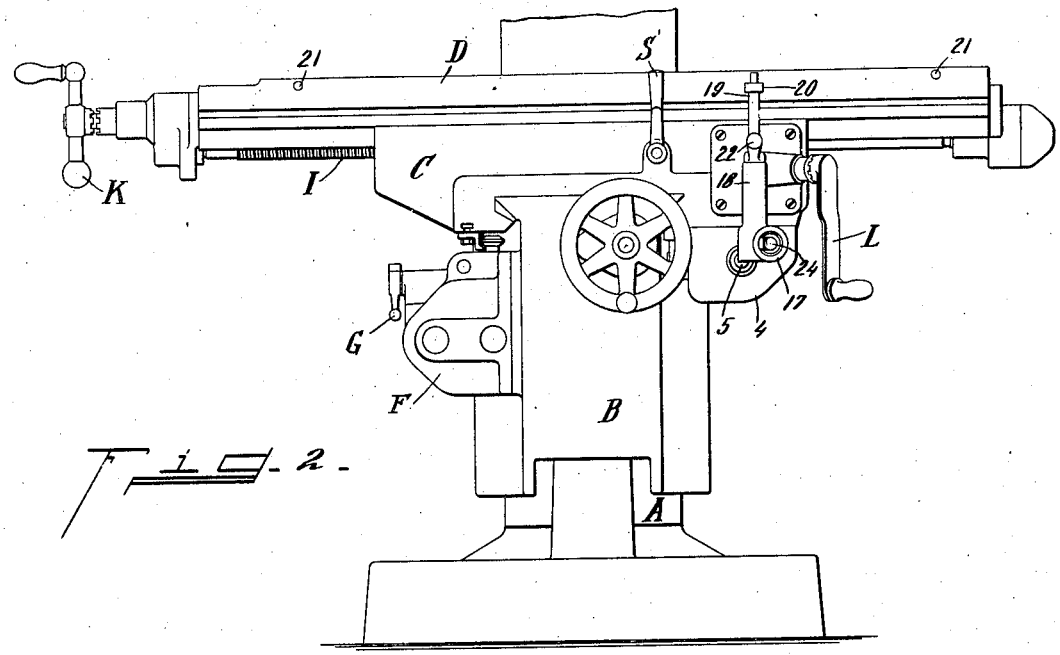
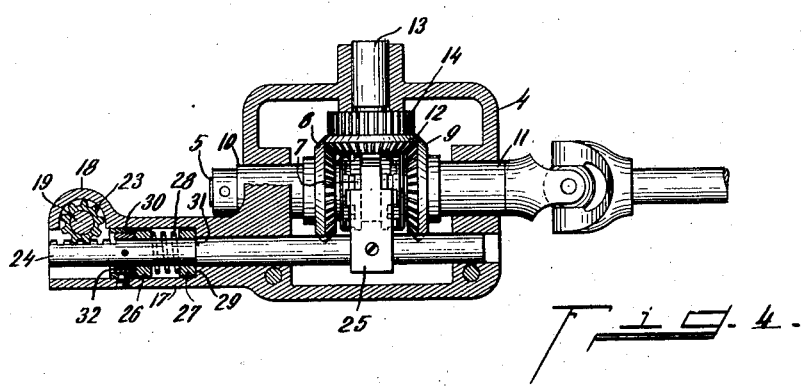
Witnesses
C. B. Foster
Olivia B. Kaiser
Inventor
Sol Einstein
By Wood Wood & Nathan
Attorneys

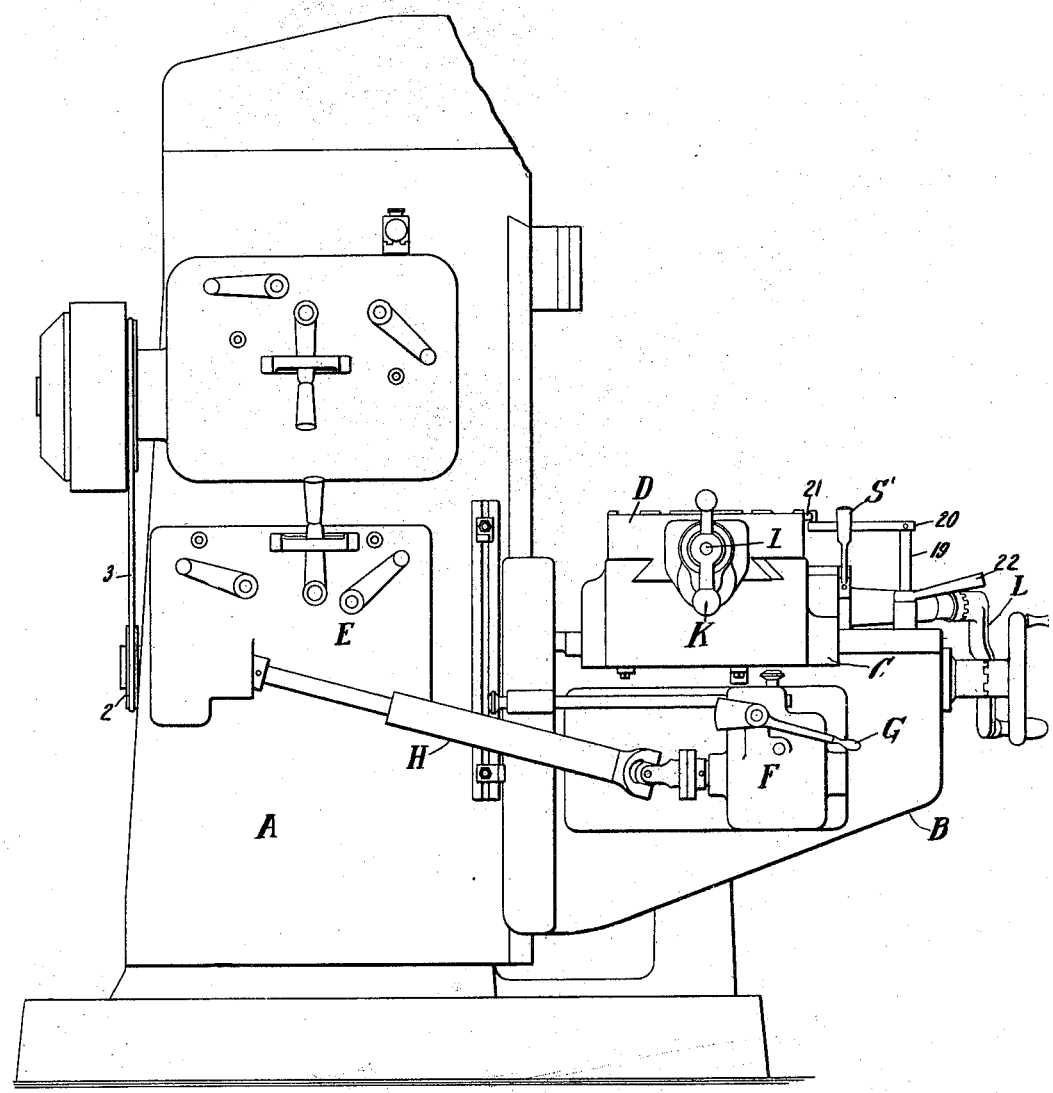

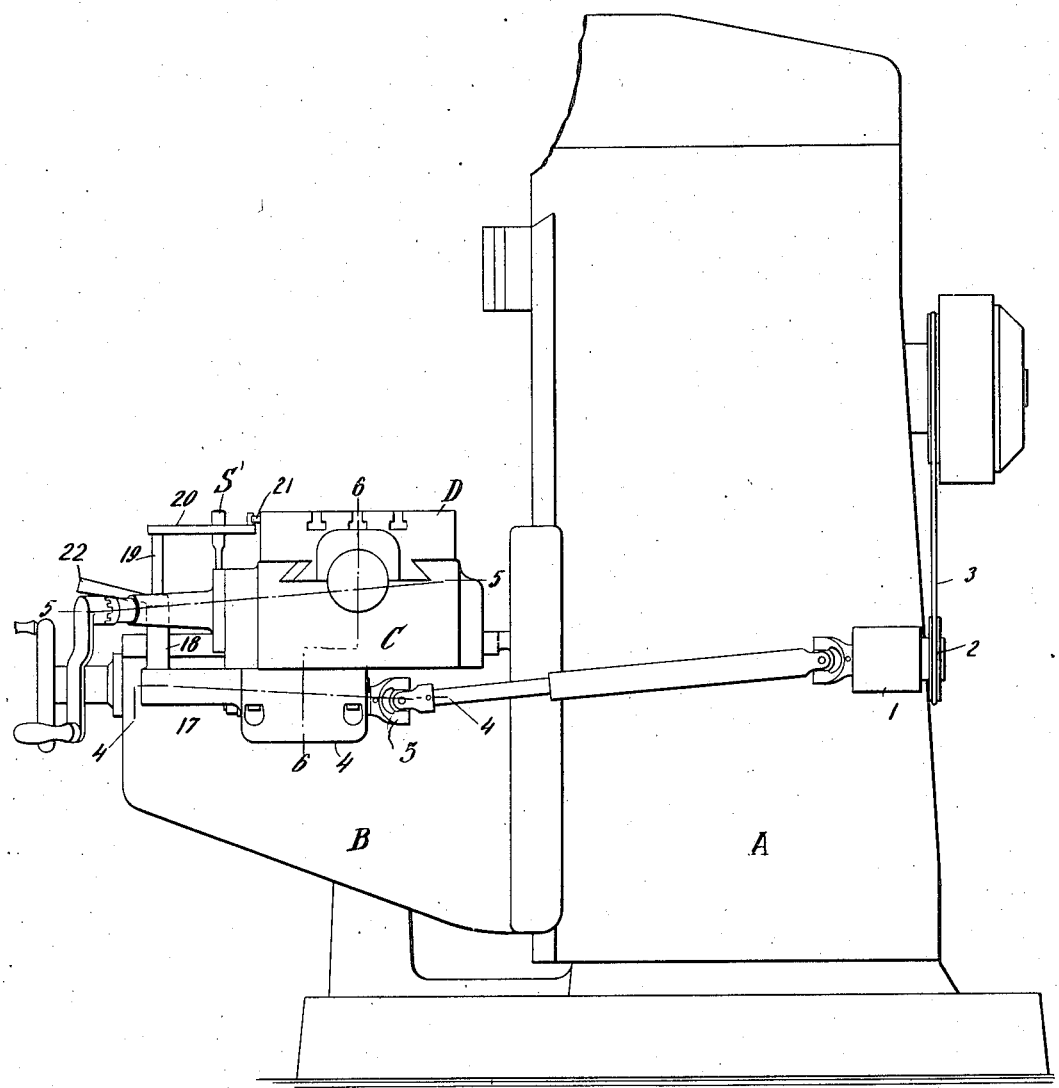

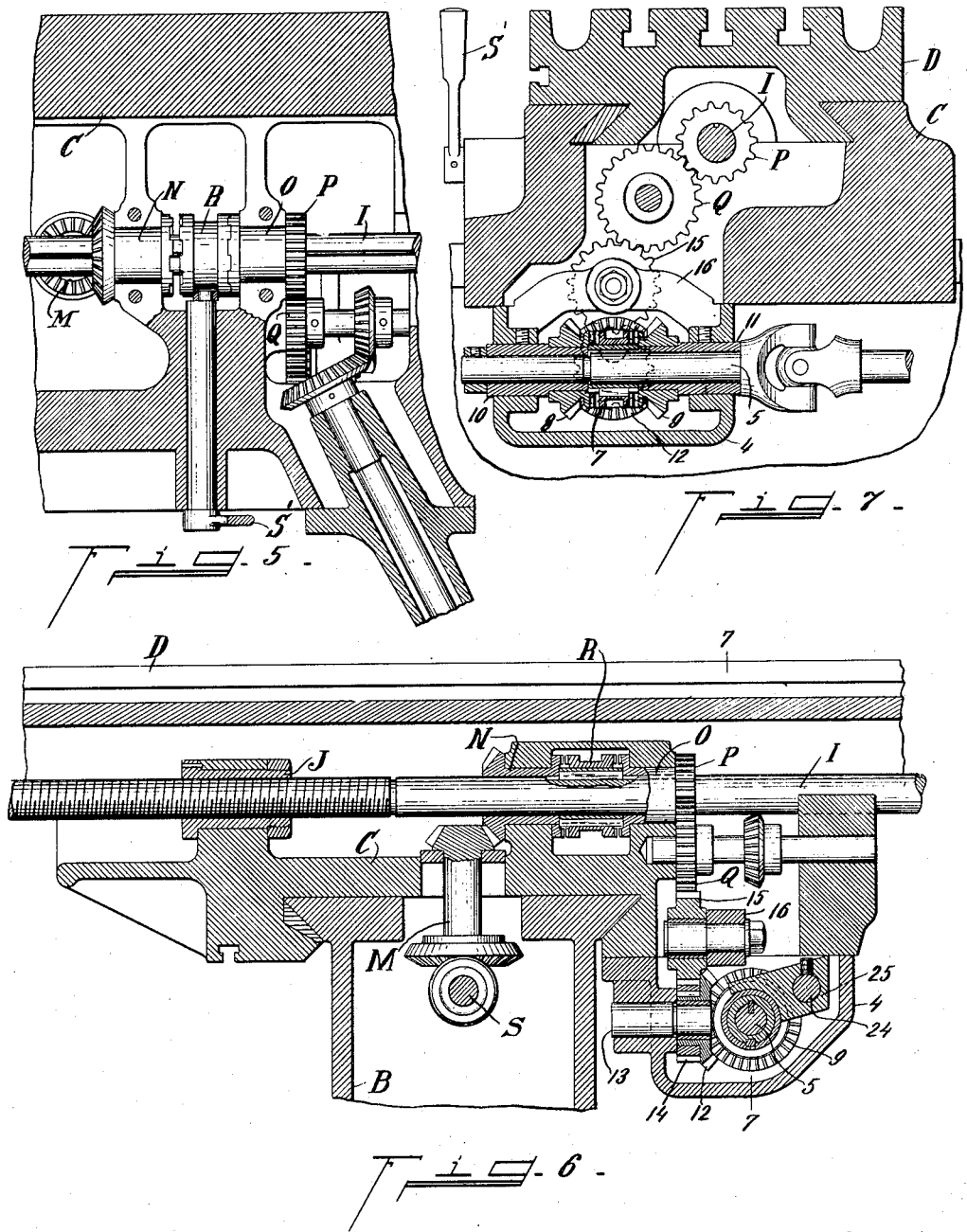

UNITED STATES PATENT OFFICE.

SOL EINSTEIN, OF CINCINNATI, OHIO, ASSIGNOR TO THE CINCINNATI MILLING MACHINE COMPANY, OF CINCINNATI, OHIO, A CORPORATION OF OHIO.

QUICK-TRAVERSE CONTROL.

1,092,097.  Specification of Letters Patent.  Patented Mar. 31, 1914.

Application filed May 27 1913. Serial No. 770,276.

*To all whom it may concern:*

Be it known that I, SOL EINSTEIN, subject of the German Emperor, and residing at Cincinnati, in the county of Hamilton and State of Ohio, have invented a new and Improved Quick-Traverse Control, of which the following specification is a full disclosure.

This invention relates to machine tools, and it deals with a mechanism whereby the "feed" of a table may be alternated at any instant with a "quick traverse", so that no time need be lost in bringing the work and the tool into position ready for a machining operation.

One object is to arrange a hand-controlled mechanism in connection with the conventional feeding instrumentalities of any given milling machine, enabling the table to be propelled rapidly by power to make a quick traverse so long as the attendant may wish, and without causing interference with the usual feeding instrumentalities.

Another object is to utilize as an attachment to any standard milling machine construction, a mechanism driven by an auxiliary belt from the prime mover, which mechanism will embody hand-controlled elements whereby it may be connected with a feed screw of the table only after the usual driving connection with such screw is interrupted, whereby the feed screw may be caused more rapidly to rotate in either direction to give the table a quick traverse for such a period as the attendant may predetermine.

Another object is to combine with any given conventional table feeding mechanism another conventional power driven propelling mechanism attached to the frame and knee of a milling machine, and extending to the vicinity of the feed screw of the table, so that the attendant may shift the driving connection of the feed screw from the one mechanism to the other, whereby the table may be propelled either at a feed speed or at a quick traversing speed.

Other purposes will be in part obvious from the annexed drawings and in part set forth in the following description.

Drawings depicting one of a great many specific constructions have been annexed to illustrate the general purposes of this mechanism, and in such drawings, like characters of reference denote corresponding parts throughout all the views, of which:—

Figure 1 is a side elevation of a conventional milling machine to which this attachment has been affixed. Fig. 2 is an end elevation of the foregoing machine. Fig. 3 is an elevation of the side opposite that shown in Fig. 1. Fig. 4 is a sectional plan view on line 4—4 of Fig. 3. Fig. 5 is a sectional plan on line 5—5 of Fig. 3. Fig. 6 is a vertical section on line 6—6 of Fig. 3. Fig. 7 is a vertical section on line 7—7 of Fig. 6.

A typical milling machine construction is shown in the drawings, and it comprises a column A, a vertically movable knee B, together with screws for elevating and lowering it, a saddle C, together with means for adjusting it on the knee toward or away from the column A, and a table D which supports the work and which is fed right and left on the saddle C by a suitable transmission system extending from a pulley on the column A. The transmission of power will take place through a suitable speed change box E whereby the feed of the table may be at a faster or a slower rate. The construction of the speed change box E is inconsequential to the subject-matter herein claimed, and therefore requires no elaboration.

Depending from the knee B is a reverse box F operated by a suitable reverse lever G whereby the direction of the feed is changed, so that the table may be power driven slowly to the right or to the left, as the case may be. The power for the feed is transmitted from the speed change box E to the reverse box F by means of a universal shaft H, thus maintaining the continuity at all positions of any of the foregoing parts.

The table D is propelled through the agency of a feed screw I, which is journaled at its ends on the ends of the table so as to reciprocate with such table. This screw passes through a nut J fixed to the saddle C so that the table will be reciprocated at a rate depending upon the speed of rotation of the screw I. This feed screw may be propelled slowly by hand if desired, by means of a hand-lever K geared in low ratio therewith, or it may be propelled rapidly by hand by means of the hand-lever L mounted on the saddle C, and geared in high ratio therewith. In the type of machine under discussion it is this last-mentioned hand-lever L that has heretofore been employed whenever the operator desired to effect a quick traverse of the table. This is essentially a quick hand return, and the main of the herein claimed subject-matter is to replace this hand-lever L by a quick power return. A vertical shaft M rises through the base of the saddle and terminates in a beveled gear meshing with a similar gear fast to the sleeve N that is journaled on the saddle and loosely circumscribes the feed screw I. This sleeve N may be regarded as being continuously rotated at speeds corresponding with the desired feed by power derived from the change box E through the universal shaft H and the reverse box F, and transmitted from said reverse box F to the sleeve N by means of conventional gearing including the shaft S' (Fig. 6) geared to the uprising shaft M shown in Figs. 5 and 6 and which is geared to the sleeve N. Another sleeve O also loosely circumscribes the feed screw I and is journaled in the saddle and at its end carries a gear P which constantly meshes with a pinion Q that serves to transmit the speed necessary to impart a quick traverse to the table. In other words, the sleeve O will be actuated rapidly while the sleeve N will be actuated slowly, and the latter by power, and the former in the instanced type of machine by means of the hand crank L, which carries a bevel meshing with a corresponding bevel on the shaft of the pinion Q.

To establish an operative driving connection between the feed screw and either the fast-rotating sleeve O or the slow-rotating sleeve N, but not with both simultaneously, a clutch member R is splined to the feed screw I and has clutch-teeth at both ends so that when it is thrown into engagement with the sleeve N by means of the hand-levers, such sleeve will rotate the screw I slowly, and conversely when it is thrown into engagement with the sleeve O, the screw I will be rotated rapidly by the sleeve O if the hand-crank L be actuated by hand.

The high-speed power-transmitting features will now be set forth and will be indicated by numerals instead of by reference letters better to distinguish them.

The power driven quick traverse proposed herein merely consists in an auxiliary transmission attached to the machine and connected with the quick traverse-gear Q so as to enable the same to be driven by power instead of by the hand-wheel L. This transmission should preferably embody a hand-control lever to reverse the direction of the drive, and if desired, to stop the transmission of motion therethrough. It will be obvious herefrom that such transmission may be applied in many different ways and many different relations with the feeding mechanism, but as this arrangement may be more readily understood by means of its simplest embodiment, such will be made the basis of this description.

Mounted at any convenient point on the column of the machine is a bracket 1 in which is journaled the shaft of an auxiliary driving pulley 2 which receives motion by a belt 3 from the primary source of power which may be either a counter-shaft pulley or preferably the main pulley of the machine.

Hung from the saddle of the machine is an auxiliary reverse box 4 into which power is transmitted by a shaft 5. This shaft is connected in driving relation with the shaft of the pulley 2, and to provide for vertical movements of the knee as well as for transverse movements of the saddle, a bearing 6 is provided on the knee and a universal shaft extends from this bearing to the bracket 1 and an extensible shaft extends from the bearing 6 to the shaft 5.

Splined to the shaft 5 is a shifting clutch 7 which in its central or neutral position enables shaft 5 to rotate without driving any other parts, and which when shifted to one side or the other will connect either bevels 8 or 9 with the shaft 5. These bevels are loosely journaled on sleeves 10 and 11 coaxial with the shaft 5 so that they may rotate independently of the same except when connected by the clutch 7. Both of these bevels 8 and 9 mesh with a bevel gear 12, which is loosely journaled on a stud 13 to which is keyed a pinion 14. This pinion 14 is in turn suitably connected with a pinion Q as by means of the idler 15 which is journaled on a bracket 16 affixed to the reverse box 4.

From the foregoing it will be perceived that when the clutch 7 is in one position, the pinion Q will drive the gear P to the right and cause a quick traverse by power in a corresponding direction, and when the clutch 7 is in another position, a power driving quick traverse will take place in the opposite direction. Of course, a hand-operated lever will be provided for thus shifting the clutch 7, and preferably this lever will be arranged so that it will be thrown into its inoperative neutral position whenever the table reaches either end of its stroke so as to prevent damage from being done in case the attendant should fail to throw the lever by hand into neutral position in ample time. This mechanism will now be described.

*The hand control for the power driven quick traverse.*—Extending from the auxiliary reverse box 4 is a hollow arm 17 from which rises a hollow post 18. A rock shaft 19 is journaled in this hollow post and carries an arm 20 that terminates in the path of a pair of dogs 21 fixed to the table adjacent each end thereof so that at the end of the table stroke one of these dogs will move the arm 20 into its neutral position, which, as will be explained, will discontinue the transmission of power through the auxiliary reverse box. A hand-lever 22 also extends from the rock-shaft 19 and may be manipulated by hand to throw in a quick traverse whenever desired in either direction. At its base the rock-shaft 19 carries a gear 23 that meshes with a rack on the end of the reciprocating shaft 24. This shaft carries a finger 25 which engages a peripheral groove in the clutch 7 and thus determines its position, so that as the shaft 24 is reciprocated the clutch 7 will be correspondingly positioned. In conjunction with one of the above-mentioned elements as with the shaft 24 is a means for resiliently retaining it in its neutral position, so that whenever the attendant releases his grip on the operating handle 22, it will swing automatically to neutral position and automatically terminate the quick traverse movement. Conveniently this may be done by providing a pair of collars 26 and 27 that are urged apart by spring 28 so that the shoulders 29 and 30 will normally limit the movement of these loose collars. The shaft, however, provides shoulders 31 and 32 fast thereto, so that if it be moved in either direction it will compress the spring 28. If released with the spring 28 under compression, then will one or the other of the collars 26 or 27, as the case may be, move the shaft 24 until such collar comes into contact with one of the fixed shoulders 29 or 30, as the case may be.

It will thus be seen that the mechanism herein described is well adapted to achieve the objects enumerated in the foregoing. Its operation in general is the same as that of the customary hand crank whereby the table may be moved rapidly by power supplied by the strength of the attendant, but here however, the power is received from the countershaft. As in the case of the hand power quick traverse mechanism, it is impossible to have the power feed and the quick traverse simultaneously operating on the feed-screw, and in this instance there is utilized the same arrangement for accomplishing the same purpose as in the conventional structure above described. That is to say, the hand-lever 22 of this attachment only becomes effective when the hand-lever S′ is in its appropriate position, i. e., when it disconnects the power feed.

Having thus revealed my invention I claim as new and desire to secure by Letters Patent of the United States:—

1. A machine tool of the nature disclosed combining a table, a screw translating therewith for reciprocating the same, power means for slowly actuating said screw to feed said table, a power driven mechanism interchangeably available to rapidly actuate said screw in either direction to produce a quick traverse of said table, and means for reversing the direction of drive of said mechanism and operable independently of said first-mentioned slowly-actuating means and without changing the direction of drive thereof.

2. A machine tool of the nature disclosed combining a table, a screw translating therewith for propelling the same, a slow-driving mechanism for said screw operable in either direction, an interchangeably available fast driving power mechanism for said screw also operable in either direction, means for disconnecting the former mechanism from said screw when the latter is operatively connected with said screw, and means for individually reversing the direction of drive of either the fast or the slow-driving mechanism independently of the other.

3. A machine tool of the nature disclosed combining a main frame, a table supported therefrom, a feed-screw translating therewith to propel said table, a constantly running main-driving pulley on said main frame, a slow driving transmission from said main driving pulley to said feed screw to propel the same at a rate corresponding with the table feeds, an auxiliary constantly running power-driven pulley mounted on said main frame remote from said main pulley, an auxiliary transmission extending from said auxiliary pulley to said feed screw to propel it at a rate corresponding with a quick traverse of said table, and hand-operated means independent of either of said pulleys for rendering either of said transmissions interchangeably available for driving said feed screw.

4. A machine tool of the nature disclosed combining a main frame, a main pulley and a secondary pulley independently mounted on said frame, and both adapted to be simultaneously power-driven, a table, a slow motion transmission extending from said main pulley to said table, a fast motion transmission extending from said auxiliary pulley to said table, a lever in each transmission for reversing the driving direction of its transmission, and means for interchangeably establishing an operative propelling connection between either of said transmission and said table.

5. A machine tool of the nature disclosed combining a table, a feed screw for reciprocating said table, a sleeve loosely circumscribing said feed screw, a slow motion power transmission for continuously rotating said sleeve, a member splined to said feed screw and having clutch teeth adapted to engage with said sleeve to transmit motion from it to said screw, an auxiliary fast driving power transmission, and a hand-operated lever for establishing connection between the same and said splined member, whereby said feed screw may be rapidly rotated independently of said sleeve.

In witness whereof, I hereunto subscribe my name, as attested by the two subscribing witnesses.

SOL EINSTEIN.

Witnesses:
CLARENCE B. FOSTER,
OLIVER B. KAISER.